(12) United States Patent
Jain

(10) Patent No.: US 11,210,275 B2
(45) Date of Patent: Dec. 28, 2021

(54) SYNTHETIC WORKLOAD GENERATION FOR WORKLOAD CLASSIFICATION

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/913,400

(22) Filed: Jun. 26, 2020

(65) Prior Publication Data

US 2021/0357376 A1 Nov. 18, 2021

(30) Foreign Application Priority Data

May 13, 2020 (IN) .............................. 202011020101

(51) Int. Cl.
| | |
|---|---|
| *G06F 17/00* | (2019.01) |
| *G06F 16/21* | (2019.01) |
| *G06N 3/04* | (2006.01) |
| *G06N 3/08* | (2006.01) |
| *G06F 16/28* | (2019.01) |

(52) U.S. Cl.
CPC .......... *G06F 16/217* (2019.01); *G06F 16/285* (2019.01); *G06N 3/0472* (2013.01); *G06N 3/088* (2013.01)

(58) Field of Classification Search
CPC .................................................. G06F 16/217
USPC .................................. 707/739, 720; 718/105
See application file for complete search history.

(56) References Cited

U.S. PATENT DOCUMENTS

| | | | |
|---|---|---|---|
| 7,480,640 B1* | 1/2009 | Elad ...................... | G06Q 10/10 706/14 |
| 8,775,413 B2* | 7/2014 | Brown .............. | G06F 16/24542 707/718 |
| 2018/0041536 A1* | 2/2018 | Berlin ..................... | G06F 21/56 707/707 |
| 2019/0297520 A1* | 9/2019 | Vedam .................. | H04L 47/823 707/707 |
| 2020/0125545 A1* | 4/2020 | Idicula .................. | G06F 16/217 707/707 |

\* cited by examiner

*Primary Examiner* — Alexandria Y Bromell
(74) *Attorney, Agent, or Firm* — Buckley, Maschoff & Talwalkar LLC

(57) ABSTRACT

A system and method are disclosed to facilitate automated database system workload classification. A utilization metrics data source may contain utilization metrics vectors associated with workloads of the database system. A variational autoencoder may receive utilization metrics vectors from the utilization metrics data source and encode the utilization metrics vectors into latent vector features. Moreover, the variational autoencoder may be trained to generate appropriate distributions around the latent vector features. A synthetic workload creation platform receives information about the distributions around the latent vector features and samples different values from the distributions to create synthetic workload vectors. A workload classification platform, trained using the synthetic workload vectors, may then generate workload classification labels for workloads running on the database system (e.g., to tune database parameters as appropriate).

18 Claims, 14 Drawing Sheets

SYNTHETIC WORKLOAD GENERATION FOR WORKLOAD CLASSIFICATION

BACKGROUND

An enterprise may use on premises systems and/or a cloud computing environment to run applications and/or to provide services. In some cases, the service being provided is associated with a DataBase Management System ("DBMS"). Moreover, a DBMS may have hundreds of configuration "knobs" that control operation of the system, such as: an amount of memory to use for caches, how often data is written to storage, how often the logs are written to disk, a maximum size of log files, a maximum number of parallel connections permitted, a number of dirty buffers to be written by the background writer, etc. Properly tuning DBMS configuration knobs based on specific workload characteristics and hardware ability can substantially influence the performance of the system.

Properly tuning database control knobs, however, can be a time consuming and complicated task. For example, the enterprise might apply a substantial human effort to analyze various configurations to suggest a set of knob setters (e.g., based on a combination of experience, estimation, and trial/error) based on the characteristics of a specific workload (e.g., for a workload classified as "heavy CPU utilization" as compared to one classified as "heavy disk utilization").

It would therefore be desirable to facilitate automated database system workload classification in an efficient and accurate manner.

SUMMARY

According to some embodiments, methods and systems may facilitate automated database system workload classification. A utilization metrics data source may contain utilization metrics vectors associated with workloads of the database system. A variational autoencoder may receive utilization metrics vectors from the utilization metrics data source and encode the utilization metrics vectors into latent vector features. Moreover, the variational autoencoder may be trained to generate appropriate distributions around the latent vector features. A synthetic workload creation platform receives information about the distributions around the latent vector features and samples different values from the distributions to create synthetic workload vectors. A workload classification platform, trained using the synthetic workload vectors, may then generate workload classification labels for workloads running on the database system (e.g., to tune database parameters as appropriate).

Some embodiments comprise: means for receiving, by a variational autoencoder, utilization metrics vectors from a utilization metrics data source that contains utilization metrics vectors associated with workloads of the database system; means for encoding, by the variational autoencoder, the utilization metrics vectors into latent vector features; means for training, by the variational autoencoder, to generate appropriate distributions around the latent vector features; means for receiving, by a synthetic workload creation platform, information about the distributions around the latent vector features; means for sampling, by the synthetic workload creation platform, different values from the distributions to create synthetic workload vectors; and means for training a workload classification platform, using the synthetic workload vectors, to generate workload classification labels for workloads running on the database system.

Some technical advantages of some embodiments disclosed herein are improved systems and methods to facilitate automated database system workload classification in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a cloud-based or on premises database system, there may be a need to map or classify workloads (e.g., whether it is an Input Output ("IO") based workload or a Central Processing Unit ("CPU") intensive workload, or a mix of both). Such a classification may help ancillary software systems and/or guide humans (e.g., DataBase Administrators ("DBAs")) take a needed action, such as apply database tuning by changing some knobs specific to the type of workload that is running on the machine.

This task might be achieved by capturing current resource usage metrics (e.g., CPU, memory, and/or disk utilization), but this approach will only result in a broad classification (e.g., 90% read and 10% write or 80% read and 20% write). Moreover, even a slight variation in the generated metrics might cause the system to fail to properly characterize the workload.

Figure 1:
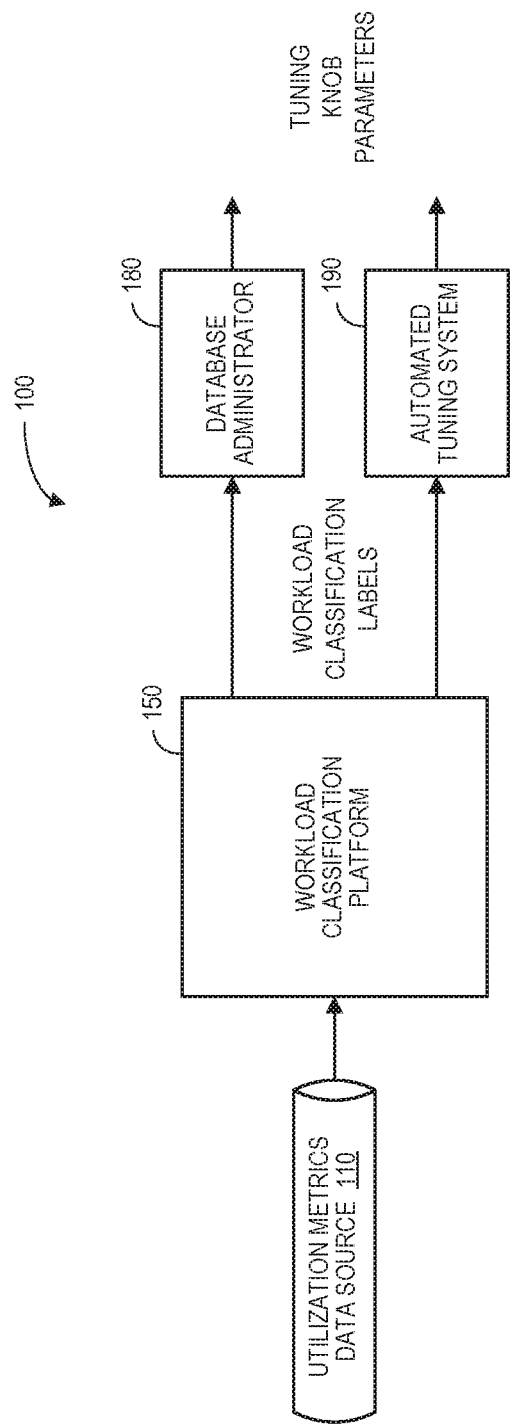
FIG. 1 is a high-level block diagram of a database system according to some embodiments.

FIG. 1 is a high-level block diagram of a database system 100 according to some embodiments. An automated workload classification platform 150 may receive information from a utilization metrics data source 110 and output workload classification labels. The labels might be provided, for example, to a DBA 180 and/or an automated tuning system 190 to generate tuning knob parameters that will improve operation of the database system 100. According to some embodiments, the system 100 may first give an identity or representation to a workload via a workload "vector." In this way, the system 100 may discover some latent feature space for the workload representation (*from the resource utilization metric) and use that feature space to give an appropriate representation to the workload.

According to some embodiments, a vector may represent the latent features of a workload in some dimensional space. The latent feature are hidden features might hypothetically comprise, for example:
CPU utilization,
read IO utilization, and
write IO utilization.

Note that these three values are provided only as examples, and other types of information might be used in addition to, or instead of those value in accordance with any of the embodiments described herein. This vector representation might be created (by training) and classified into different classes, labels, or categories, such as:
90% read, 10% write,
80% read, 20% write,
70% read, 30% write,
60% read, 40% write,
50% read, 50% write,
40% read, 60% write,
30% read, 70% write,
20% read, 80% write, and
10% read, 90% write.

Figure 2:
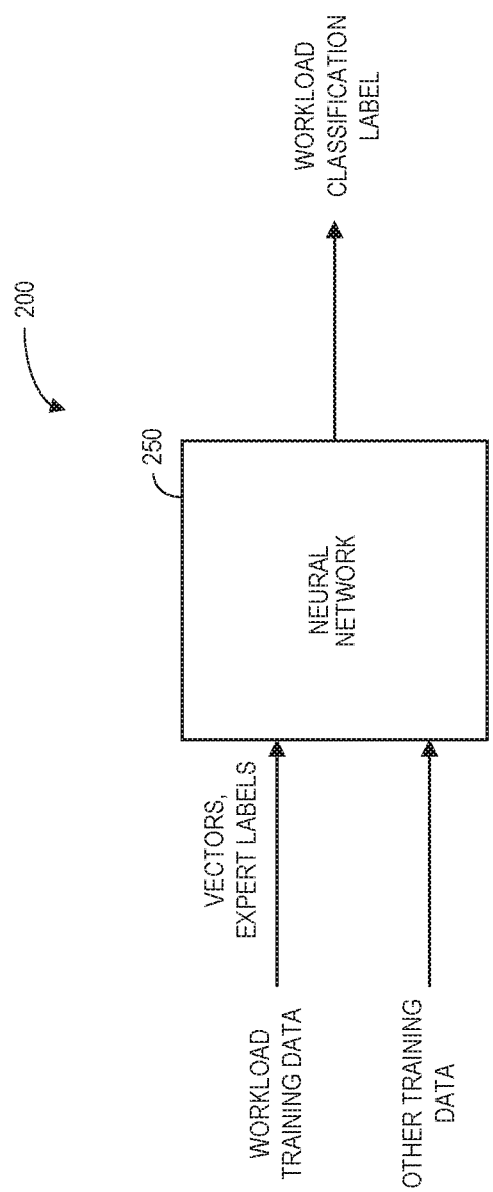
FIG. 2 illustrates the creation of workload classification labels using a neural network in accordance with some embodiments.
Figure 3:
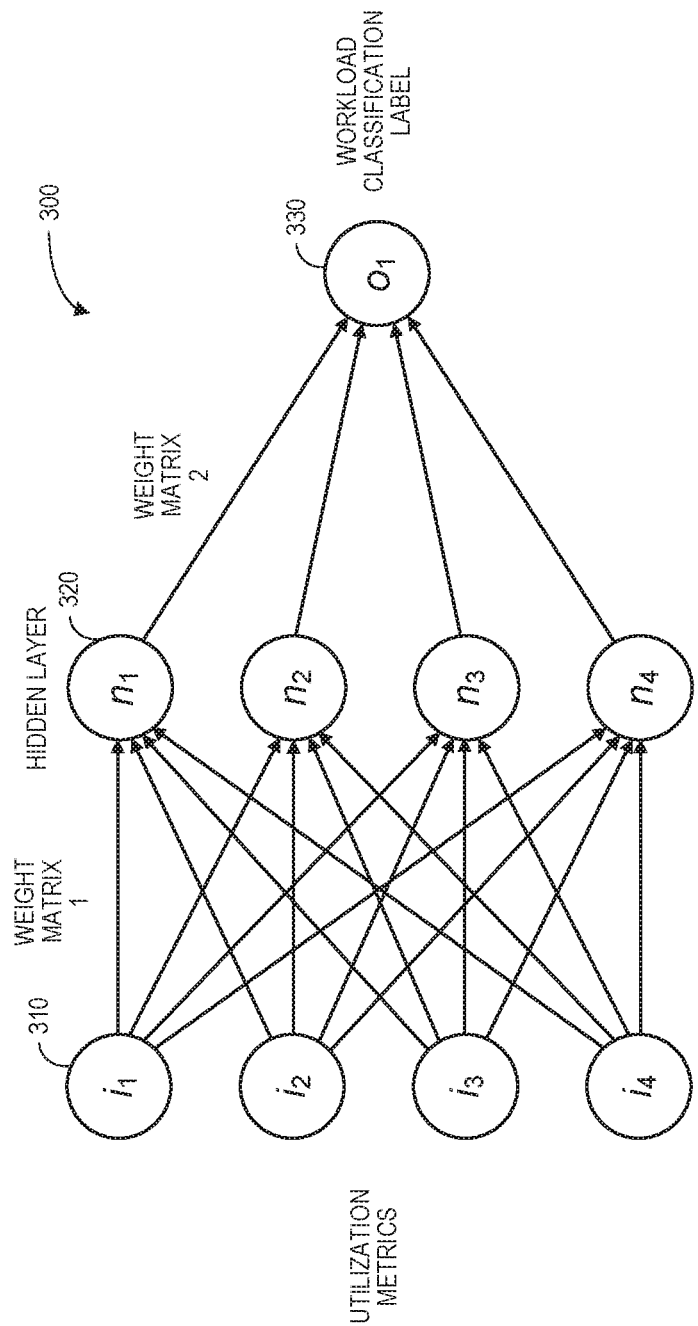
FIG. 3 is a feedforward two-layer neural network according to some embodiments.

FIG. 2 illustrates 200 the creation of workload classification labels using a neural network in accordance with some embodiments. In particular, a neural network 250 may receive workload training data (e.g., utilization metrices in form of vectors and labels provided by experts) and generate workload classification labels. As will be described, the neural network 250 may also receive other types of training data (e.g., synthetic workload information). As used herein, the phrase "neural network" may refer to an artificial neural network, composed of artificial neurons or nodes for solving Artificial Intelligence ("AI") problems, such as a feedforward two-layer neural network. For example, FIG. 3 is a feedforward two-layer neural network 300 according to some embodiments. In particular, the network 300 may apply a first weight matrix to utilization metrics (e.g. input nodes 310 $i_1$ through $i_4$) to generate a hidden layer 320 (nodes $n_1$ through $n_4$). A second weight matrix may then be applied to the hidden layer 320 to generate a workload classification label (output node 330 $o_1$).

Figure 4:
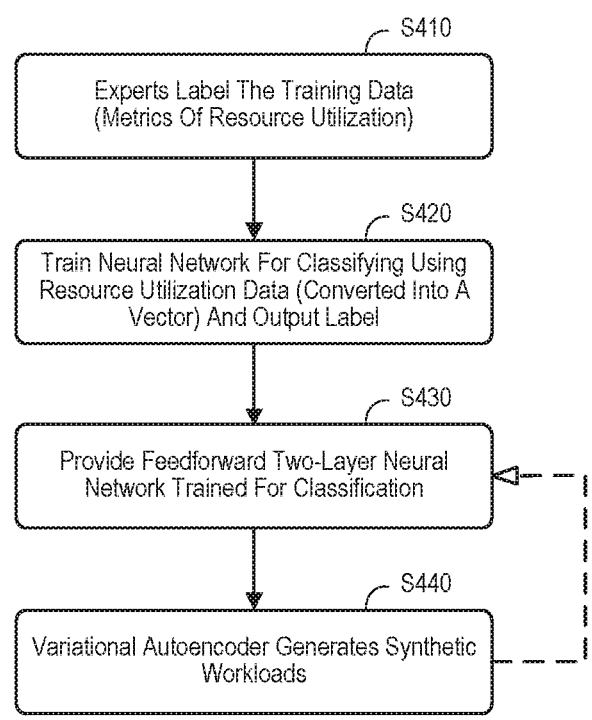
FIG. 4 illustrates a database system workload classification method according to some embodiments.

FIG. 4 illustrates a database system workload classification method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, experts may label training data (e.g., metrics of resource utilization such as CPU utilization, IO utilization, etc.). At S420, the system may train a neural network to classify using resource utilization data (converted into a vector) and output a workload classification label. At S430, a neural network (e.g., a simple feedforward two-layer neural network) may be trained for classification. The neural network might be trained, for example, using Stochastic Gradient Decent ("SGD") and cross entropy as the loss function. At S440, a variational autoencoder may be to generate synthetic workloads that can be fed back to S430 to improve the classification (as illustrated by the dashed arrow in FIG. 4). After the neural network in S430 is trained, it can then act as a classifier for similar workloads.

Note, however, that the actual Out Of Distribution ("OOD") data may have variance (in terms of varying metrices), and, as a result, the classification may be performed incorrectly. To avoid such a situation, the system might utilize more and more actual workloads to make the classification better. Because the system may be limited by the amount of actual training data that is available, another approach would be to generate some synthetic workloads. By using synthetic workloads, the system may represent them as vectors which are similar to the vectors of actual workload classes. What this means is that instead of learning a feature vector the system may learn a distribution for each individual feature. According to some embodiments, a system may alternatively learn a joint distribution instead of a conditional.

Figure 5:
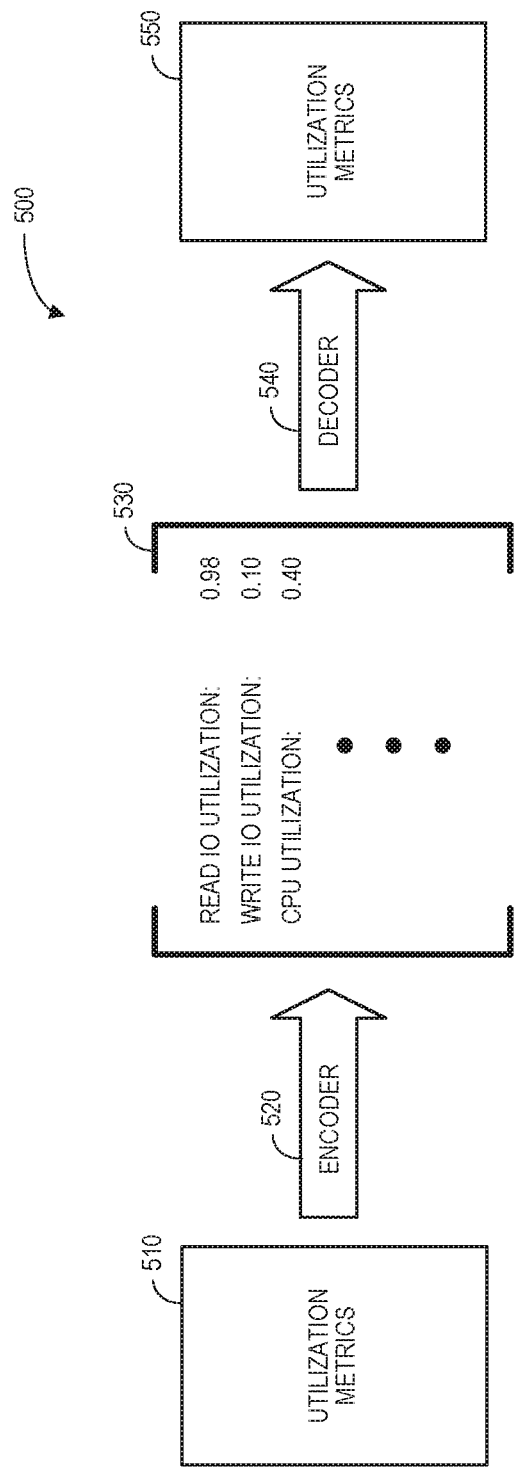
FIG. 5 is an autoencoder for a database system.
Figure 6:
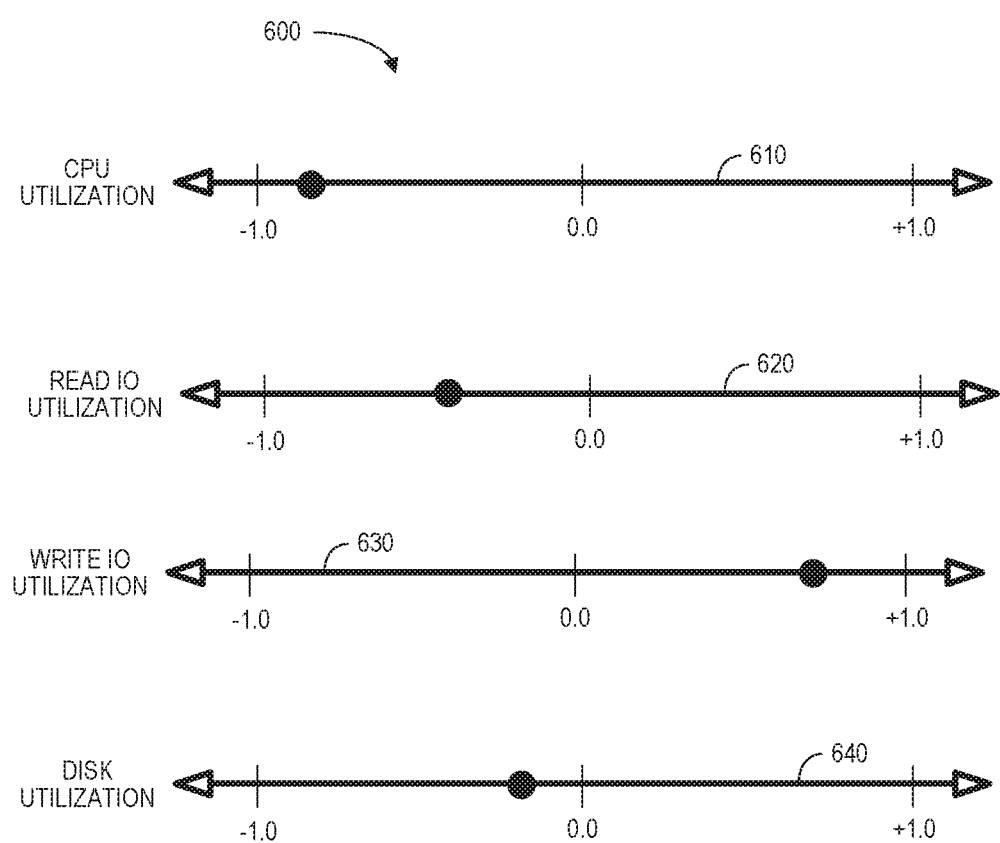
FIG. 6 includes graphs that show vectors representing workloads in discrete space.

Consider, for example, FIG. 5 which is an autoencoder 500 for a database system. In particular, the autoencoder 500 includes an encoder 520 that creates (e.g., by compression and extraction) a latent vector 530 (e.g., read IO utilization of 0.98, write IO utilization of 0.10, CPU utilization of 0.40, etc.) from input utilization metrics 510. The autoencoder 500 also includes a decoder 540 that re-generates output utilization metrics 550 (e.g., for a DBA or automated system) from the latent vector 530. The encoder 520 is represented by one neural network whose job is to encode the input (in this case the utilization metrices 510 vector) into the latent vector 530. The output of encoder is a vector which becomes input to the decoder 540 network which is trained to generate the output utilization metrics 550 (which is nothing but the input itself). This might be done, for example, via a single network as well (where the hidden layer becomes the latent vector representation for the workload). So, basically, the system has learned a compression/decompression function via a neural network. The latent vector 530 (the output of the encoder 520) represents the hidden features (e.g., the most important features which are representative) of the specific workload. FIG. 6 includes graphs 600 that show vectors representing workloads in discrete space. In particular, the graphs 600 include CPU utilization 610, read IO utilization 620, write IO utilization 630, and disk utilization 640. The learned vector (illustrated by black circles on the graphs 600 of FIG. 6) represents a workload in a discrete space. This might not be very useful because it only represents a vector of the existing workload. Instead, multiple similar workloads may be desired which can then be used to train and improve a classification engine.

Figure 7:
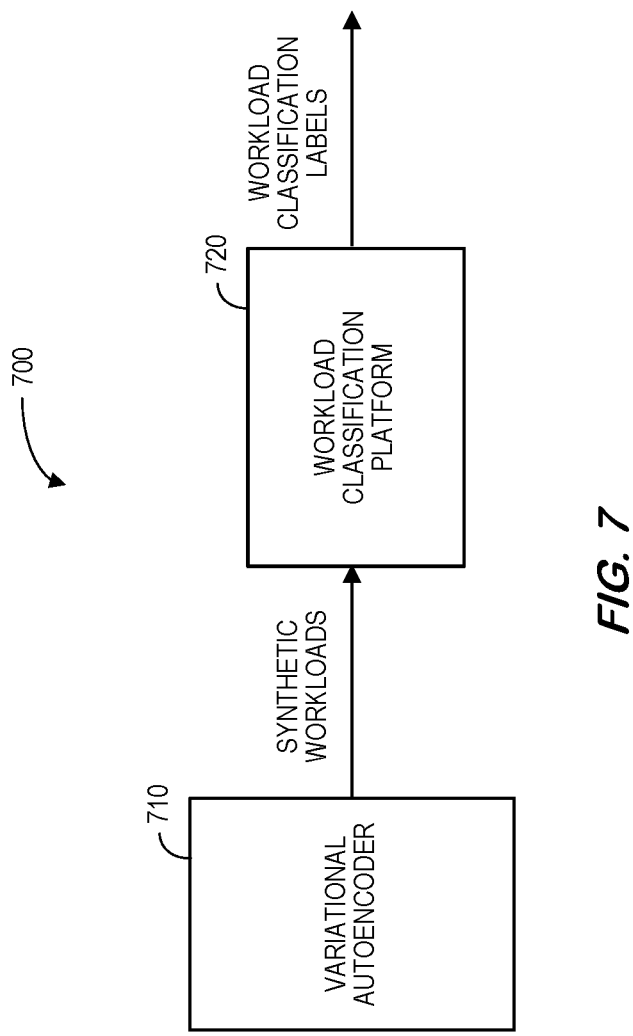
FIG. 7 illustrates a system in which a variational autoencoder creates synthetic workloads in accordance with some embodiments.
Figure 8:
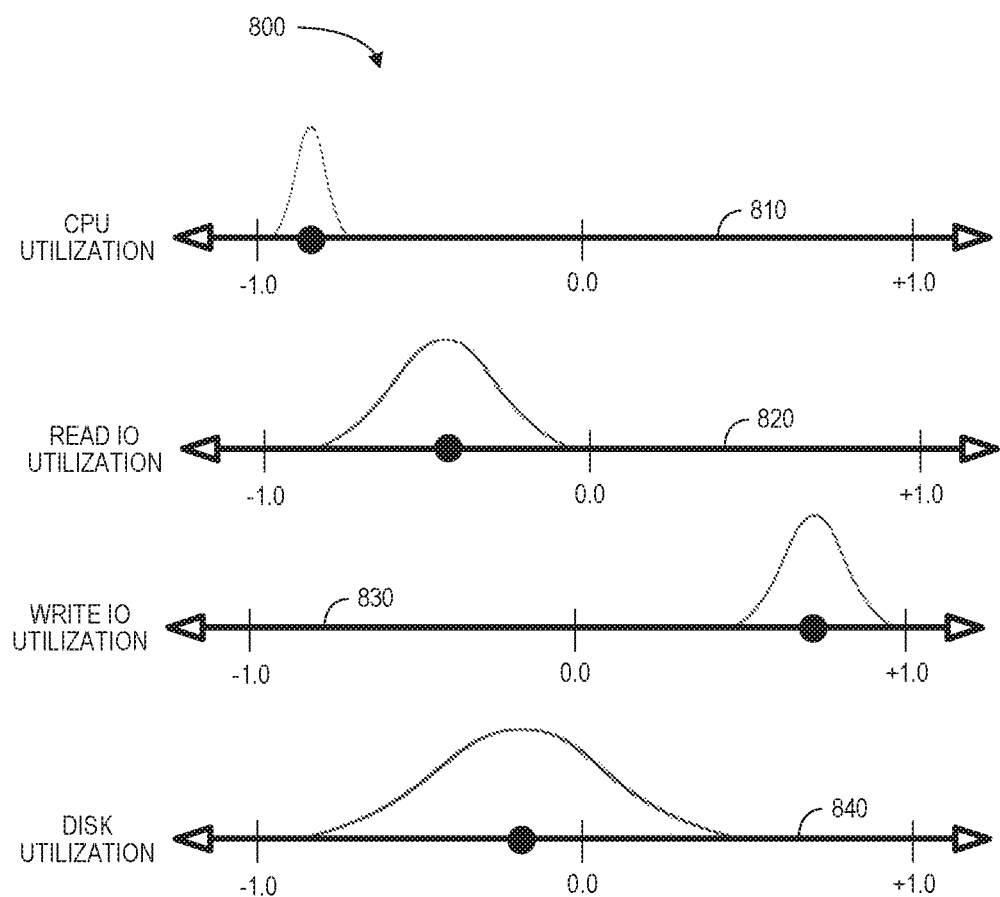
FIG. 8 includes graphs that show vector distributions representing workloads in accordance with some embodiments.

According to some embodiments, a "variational autoencoder" mechanism may be applied in the area of workload generation (e.g., to generate synthetic workloads). For example, FIG. 7 illustrates a system 700 in which a variational autoencoder 710 creates synthetic workloads that are provided to train workload classification platform 720 in accordance with some embodiments. After training, the workload classification platform 720 can generate accurate workload classification labels (e.g., to be used by a DBA or automated tuning system). Instead of generating a discrete vector for latent features, the variational autoencoder 710 generates a distribution around each feature. For example, FIG. 8 includes graphs 800 that show vector distributions representing workloads in accordance with some embodiments. As before, the graphs 800 include CPU utilization 810, read IO utilization 820, write IO utilization 830, and disk utilization 840. The learned vector (illustrated by the area under the curves on the graphs 800 of FIG. 8) represents a vector of distributions. Note that, according to some embodiments, the distributions may simply be Gaussian. If the output of the encoder is a vector of these distributions, the system can sample different values from that distribution and train it to generate the same output (that same as the input to the encoder). Over a period of training, the encoder will also learn to generate a smooth probability distribution of the latent features.

If the system samples these distributions, synthetic workload vectors may be generated that are very close to the input workload vector. What this means is that the system can then use these synthetic workloads to further train a classification network and improve the classification process. Once the classifier is trained, it will be better able handle variations in metrics and provide an accurate classification for running workloads.

Figure 9:
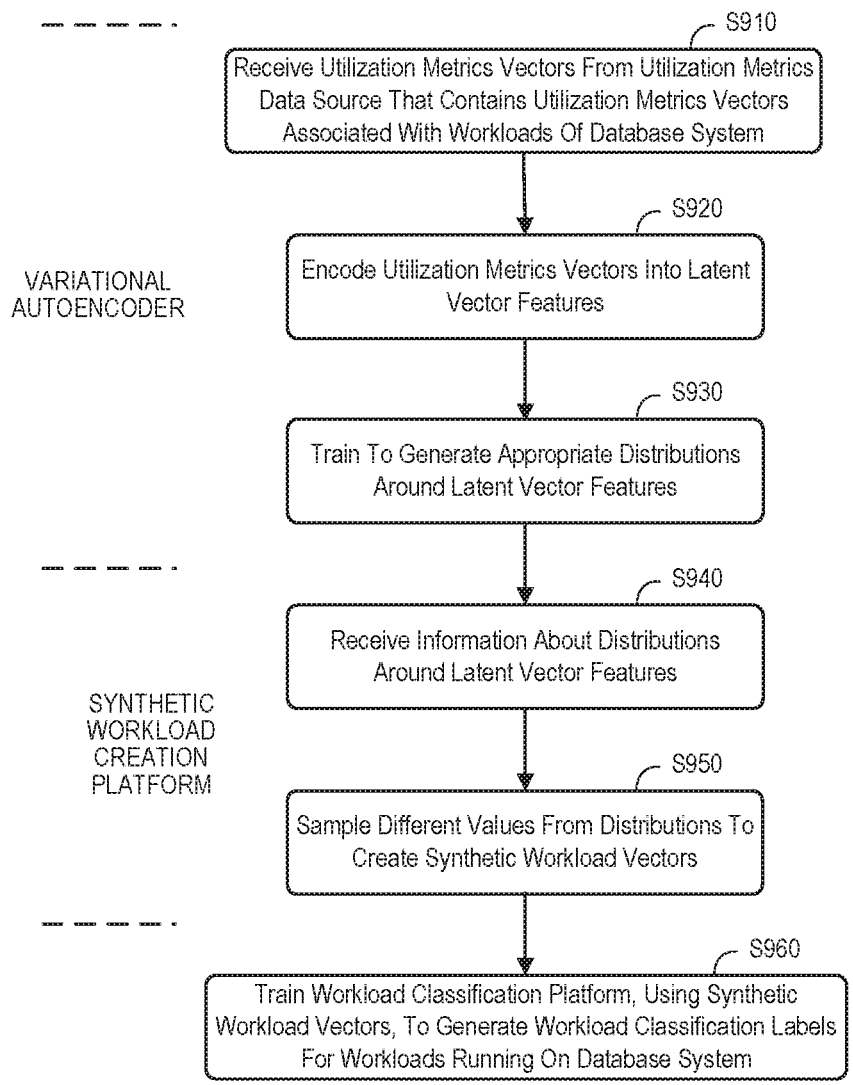
FIG. 9 illustrates a synthetic workload vector creation method according to some embodiments.

FIG. 9 illustrates a synthetic workload vector creation method according to some embodiments. Note that steps S910 through S930 may be associated with a variational autoencoder while steps S940 and S950 may be associated with a synthetic workload creation platform. At S910, the variational autoencoder may receive utilization metrics vectors from a utilization metrics data source (e.g., containing utilization metrics vectors associated with workloads of the database system). At S920, the variational autoencoder may encode the utilization metrics vectors into latent vector features and train, at S930, to generate appropriate distributions around the latent vector features.

At S940, the synthetic workload creation platform may receive information about the distributions around the latent vector features. At S950, the synthetic workload creation platform may sample different values from the distributions to create synthetic workload vectors. At S960, a workload classification platform may be trained (using the synthetic workload vectors) to generate workload classification labels for workloads running on the database system.

Figure 10:
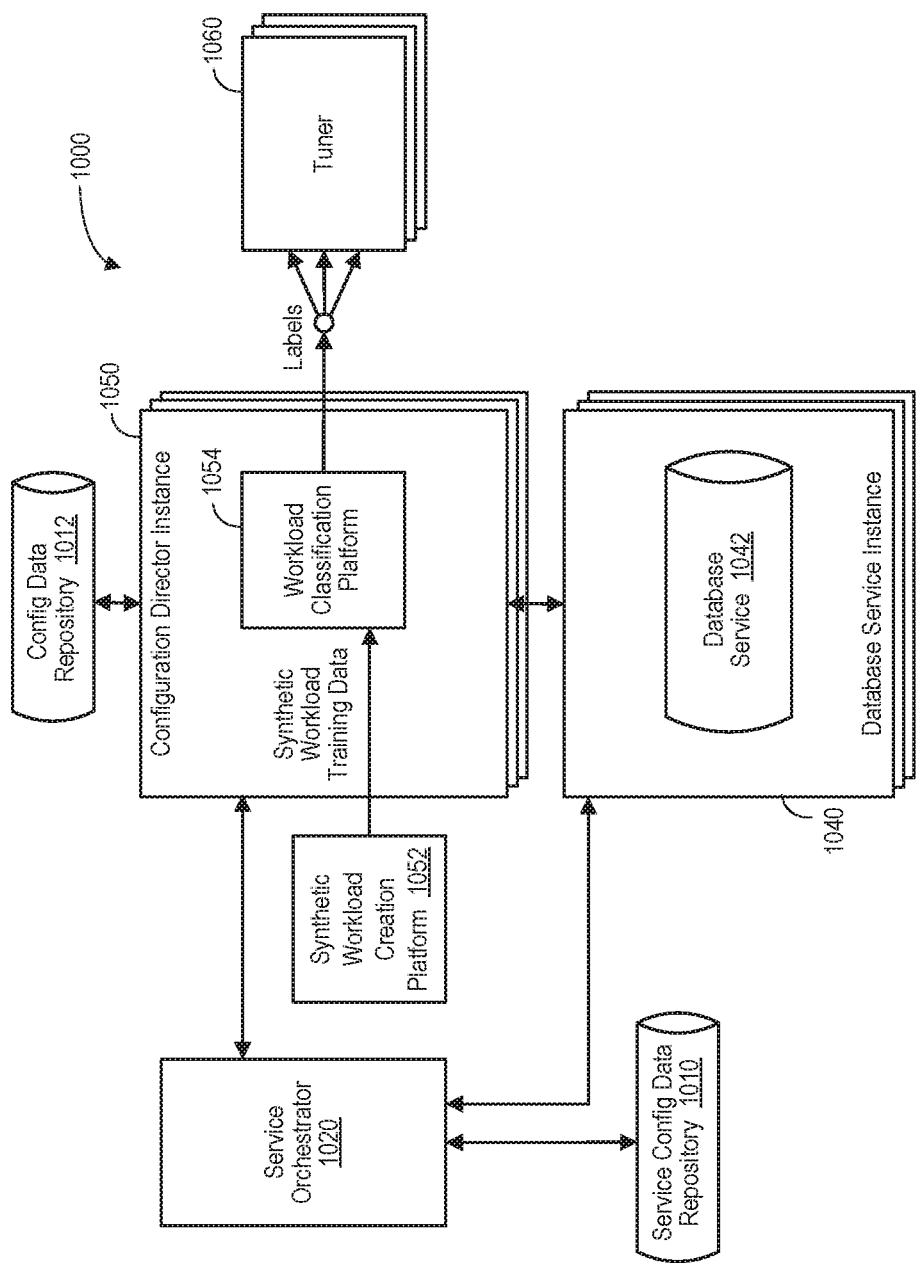
FIG. 10 is a high-level block diagram of a database tuning as a service system in accordance with some embodiments.

FIG. 10 is a high-level block diagram of a system 1000 associated with a database tuning as a service framework in accordance with some embodiments. The system 1000 includes a service configuration ("config") data repository 1010 and a service orchestrator 1020 that is coupled to database service instances 1040 and configuration director instances 1050. Database services 1042 may result in the configuration director instance 1050 requesting that an automated tuner 1060 adjust control knobs. As used herein, the term "automated" may refer to, for example, actions that can be performed with little or no human intervention. According to some embodiments, such a request might include a workload classification label generated by a workload classification platform 1054 trained using synthetic workload training data from a synthetic workload creation platform 1052 in accordance with any of the embodiments described herein.

Results from the tuner 1060 may be tested and a configuration data repository 1012 may be updated as appropriate by an Infrastructure-as-a-Service ("IaaS") provider. As used herein, the term IaaS may refer to any shared pools of configurable computer system resources and higher-level services that can be rapidly provisioned with minimal management effort (e.g., via the Internet). According to some embodiments, an IaaS provider may be associated with an IaaS data center that provides high-level Application Programming Interfaces ("APIs") to de-reference various low-level details of an underlying network infrastructure like physical computing resources, location, data partitioning, scaling, security, backup, etc. According to other embodiments, an IaaS provider can be used along with a Platform-as-a-Service ("PaaS") offering that provides a platform allowing user to develop, run, and manage applications without the complexity of building and maintaining the infrastructure typically associated with developing and launching applications.

According to some embodiments, devices, including those associated with the system 1000 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 1000 may store information into and/or retrieve information from various data stores (e.g., the database services 1042, service config data repository 1010, and config data repository 1012), which may be locally stored or reside remote from the database service instances 1040 and/or configuration director instances 1050. Although a single service orchestrator 1020 is shown in FIG. 10, any number of such devices may be included. Moreover, various devices described herein might be combined according to embodiments of the present invention. For example, in some embodiments, the service orchestrator 1020 and service config data repository 1010 might comprise a single apparatus. The system 1000 functions may be performed by a constellation of networked apparatuses, such as in a distributed processing or cloud-based architecture.

Figure 11:
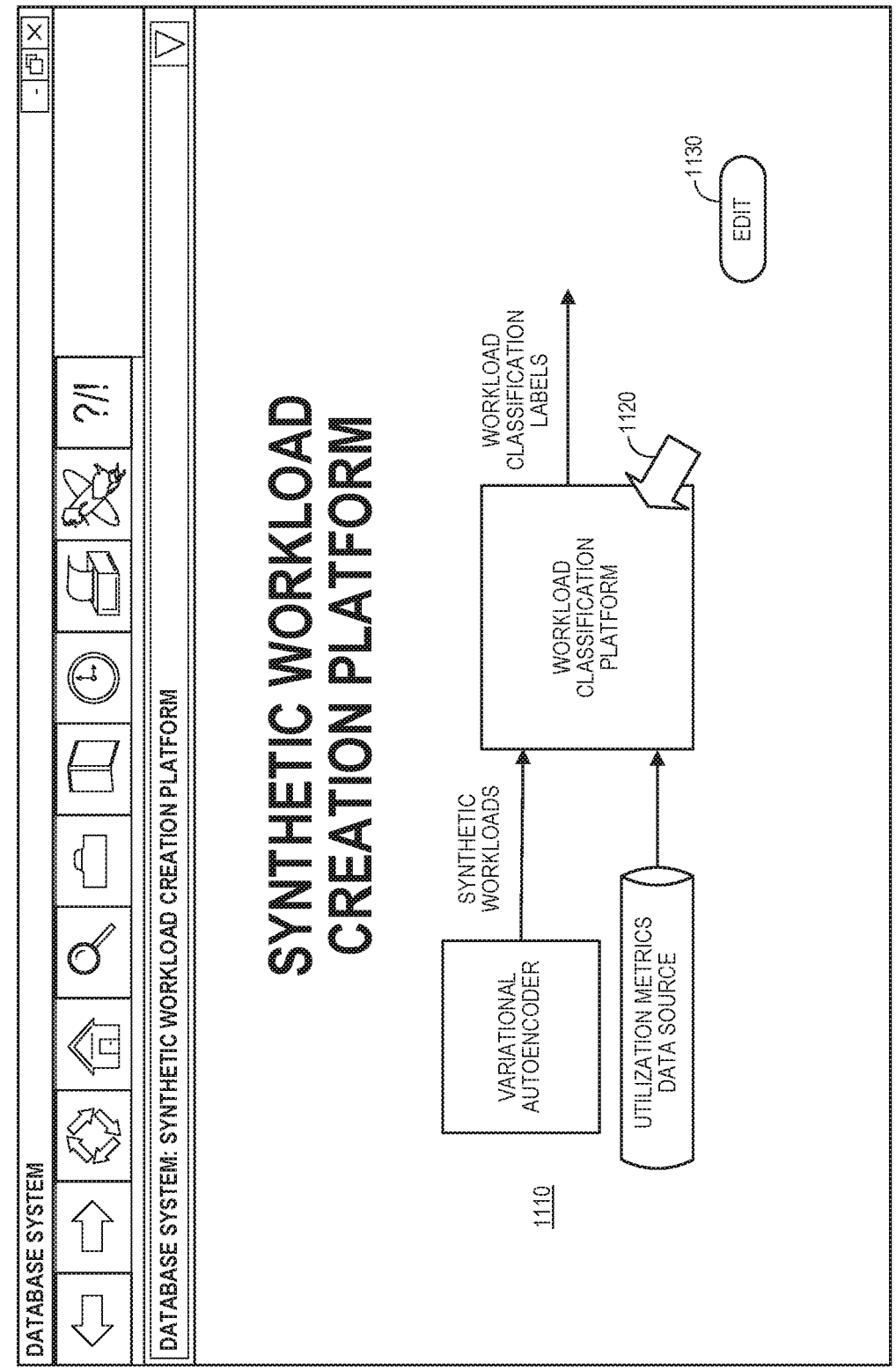
FIG. 11 is a human machine interface display according to some embodiments.

A user (e.g., a database administrator) may access the system 1000 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate a training process) and/or provide or receive automatically generated recommendations or results from the system 1000. For example, FIG. 11 is a human machine interface display 1100 in accordance with some embodiments. The display 1100 includes a graphical representation 1110 or dashboard that might be used to monitor the health of a database system framework (e.g., associated with a cloud provider). In particular, selection of an element (e.g., via a touchscreen or computer pointer 1120) might result in display of a popup window that contains configuration data. The display 1100 may also include a user selectable "Edit" icon 1130 to request system changes (e.g., to investigate or improve system performance).

Figure 12:
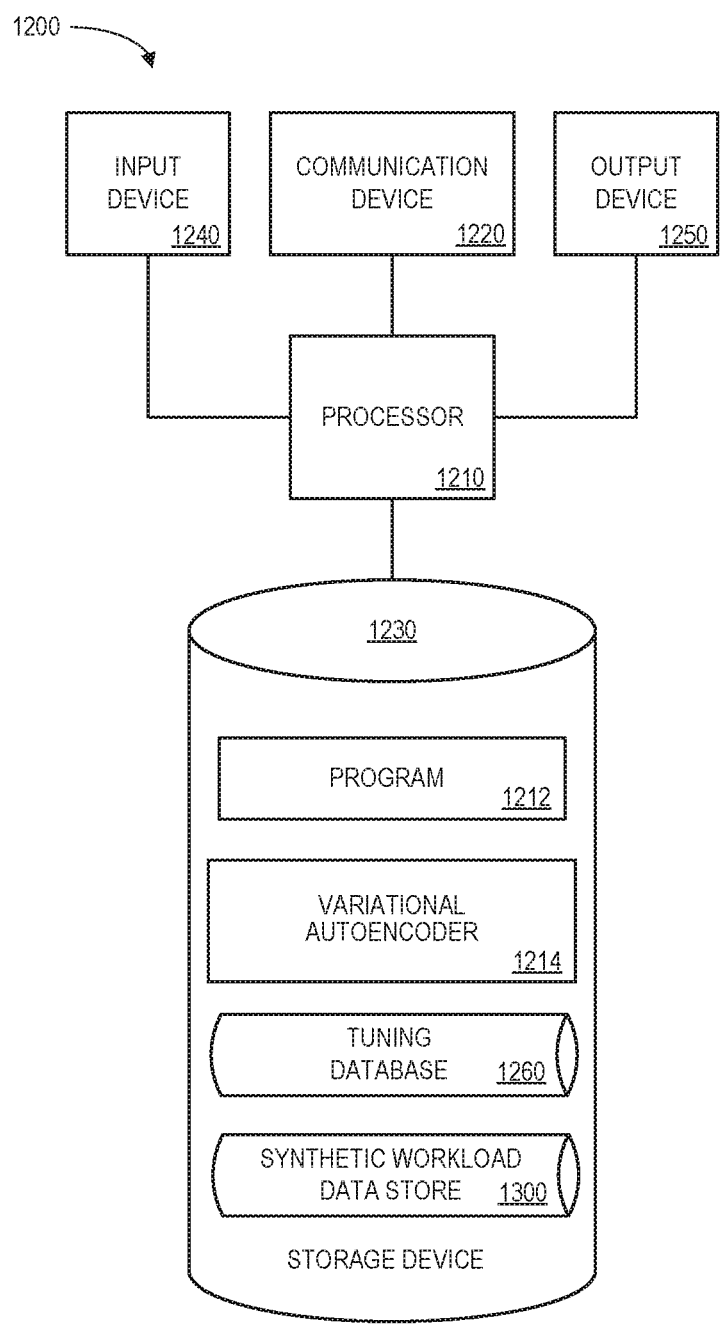
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the system 100 of FIG. 1 (and/or any other system described herein). The platform 1200 comprises a processor 1210, such as one or more commercially available CPUs in the form of one-chip microprocessors, coupled to a communication device 1220 configured to communicate via a communication network (not shown in FIG. 12). The communication device 1220 may be used to communicate, for example, with one or more remote user platforms, resource allocators, etc. The platform 1200 further includes an input device 1240 (e.g., a computer mouse and/or keyboard to input database training or tuning information) and/an output device 1250 (e.g., a computer monitor to render a display, transmit recommendations, and/or create database service reports). According to some embodiments, a mobile device and/or PC may be used to exchange information with the platform 1200.

The processor 1210 also communicates with a storage device 1230. The storage device 1230 can be implemented as a single database or the different components of the storage device 1230 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or variational autoencoder 1214 for controlling the processor 1210. The processor 1210 performs instructions of the programs 1212, 1214, and thereby operates in accordance with any of the embodiments described herein. For example, the processor 1210 may facilitate automated database system workload classification. The processor 1210 may receive utilization metrics vectors from a utilization metrics data source and encode the utilization metrics vectors into latent vector features. Moreover, the variational autoencoder 1214 may be trained to generate appropriate distributions around the latent vector features. The processor 1210 may receive information about the distributions around the latent vector features and sample different values from the distributions to create synthetic workload vectors. A workload classification platform, trained using the synthetic workload vectors, may then generate workload classification labels for workloads running on the database system (e.g., to tune database parameters as appropriate in accordance with the tuning database 1260).

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores the tuning database and a synthetic workload data store 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 illustrates a synthetic workload database in accordance with some embodiments.

Referring to FIG. 13, a table is shown that represents the synthetic workload data store 1300 that may be stored at the platform 1200 according to some embodiments. The table may include, for example, entries identifying. The table may also define fields 1302, 1304, 1306, 1308, 1310 for each of the entries. The fields 1302, 1304, 1306, 1308, 1310 may, according to some embodiments, specify: a synthetic workload identifier 1302, utilization metrics 1304, a variational autoencoder identifier 1306, a date and time 1308, and synthetic workflow vectors 1310. The synthetic workload data store 1300 may be created and updated, for example, a new workload classification platform needs to be created, new running workload data is analyzed, etc.

The synthetic workload identifier 1302 identifier 1302 might be a unique alphanumeric label or link that is associated with a particular synthetic workload that was created by a synthetic workload generation platform to train a workload classification platform. The utilization metrics 1304 might represent CPU usage, IO usage, disk usage, etc. that were used to create a latent vector for a variational autoencoder. The variational autoencoder identifier 1306 might represent the AI model that was used to generate the synthetic workload and the date and time 1308 might indicate when the AI model was created, modified, or executed. The synthetic workflow vectors 1310 may include the data that can be used to train the workload classification platform.

In this way, embodiments may facilitate automated database system workload classification in an efficient and accurate manner. Note that the workload classification can be applied to all kinds of workloads, including on premises, cloud-based, ABAP, etc. Once a workload representation is obtained, the system can use the information for workload classification to drive downstream systems that apply tuning knobs for running workloads. Some embodiments may use the information to improve placement decisions for running workloads. For example, a DBA might place similar workloads (like two high IO usage workloads) separate from each other so that resources can be adequately shared. Currently, orchestrators don't take this kind of classification information into account. Embodiments may also let systems be sized better because it is known that a specific application has a specific type of workload most of the time. This workload classification information can then help guide the appropriate sizing of underlying resources.

Embodiments may improve user friendliness by letting a database be tuned automatically (without needing a DBA) and reduce the response time for interactions and/or to complete operational tasks (e.g., to retrieve information from the database). According to some embodiments, an increase in growth and/or scale may be provided (e.g., because increased workload classification accuracy may improve the quality of tuning requests) along with a reduced time to impact revenue (that is, databases may be deployed more quickly). Moreover, an increase of business growth, productivity, efficiency, and quality may be provided by the various embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
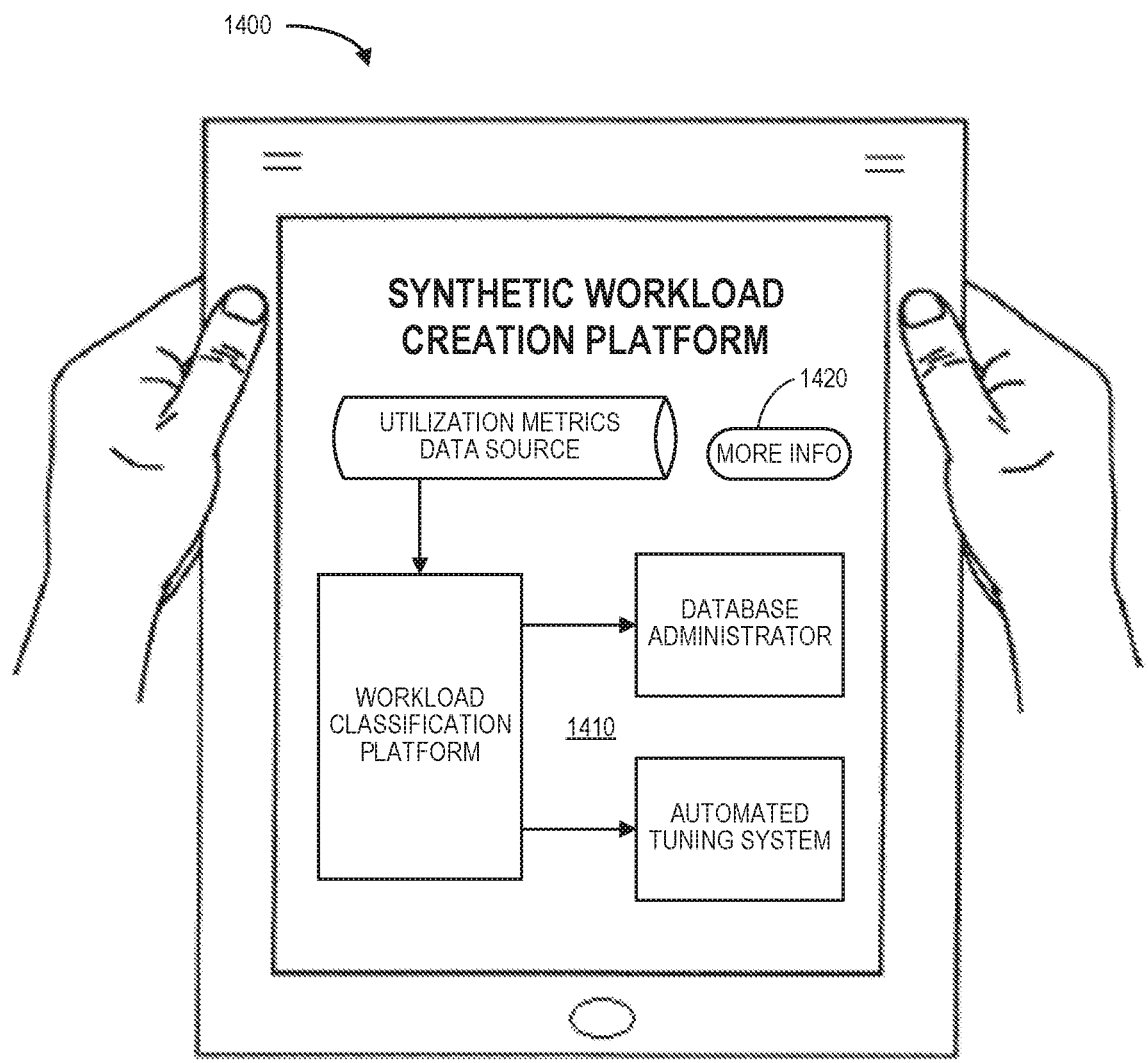
FIG. 14 illustrates a handheld tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database systems, any of the embodiments described herein could be applied to other types of database systems. Moreover, the displays shown herein are provided only as examples, and any other type of user interface could be implemented. For example, FIG. 14 shows a handheld tablet computer 1400 rendering a synthetic workload creation platform display 1410 that may be used to monitor the performance of database system framework components and/or to request additional information (e.g., via "More Info" icon 1420).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate automated database system workload classification, comprising:
   a utilization metrics data source containing utilization metrics vectors associated with workloads of the database system;
   a variational autoencoder, coupled to the utilization metrics data source, adapted to: (i) receive utilization metrics vectors from the utilization metrics data source, (ii) encode the utilization metrics vectors into latent vector features, and (iii) train to generate appropriate distributions around the latent vector features;
   a synthetic workload creation platform, coupled to the variational autoencoder, including:
      a computer processor, and
      a computer memory storing instructions that, when executed by the computer processor, cause the variational autoencoder to: (i) receive information about the distributions around the latent vector features, and (ii) sample different values from the distributions to create synthetic workload vectors; and
   a workload classification platform, trained using the synthetic workload vectors, to generate workload classification labels for workloads running on the database system, wherein the workload classification labels are used to adjust at least one tunable parameter of the database system.

2. The system of claim 1, wherein the database system is associated with at least one of: (i) an on-premises database system, (ii) a cloud-based database system, (iii) an Advanced Business Language Application Programming ("ABAP") database system, and (iv) an in-memory, column-oriented, relational database management system.

3. The system of claim 1, wherein the workloads are associated with at least one of: (i) Kubernetes, (ii) containers, and (iii) Virtual Machines ("VMs").

4. The system of claim 1, wherein the utilization metrics vectors are created based on at least one of: (i) Central Processing Unit ("CPU") utilization, (ii) read Input Output ("IO") utilization, (iii) write IO utilization, (iv) memory utilization, and (v) disk utilization.

5. The system of claim 1, wherein the distributions around the latent vector features are Gaussian.

6. The system of claim 1, wherein the tunable parameter is associated with at least one of: (i) memory knobs, (ii) background writer knobs, (iii) asynchronous and planner estimate knobs, (iv) locking knobs, and (v) any other relevant knob.

7. The system of claim 1, wherein the workload classification labels generated by the workload classification platform are also used to make placement decisions for the workloads running on the database system.

8. The system of claim 1, wherein the workload classification labels generated by the workload classification platform are also used to determine appropriate resource sizes for database systems.

9. A computer-implemented method to facilitate automated database system workload classification, comprising:
   receiving, by a variational autoencoder, utilization metrics vectors from a utilization metrics data source that contains utilization metrics vectors associated with workloads of the database system;
   encoding, by the variational autoencoder, the utilization metrics vectors into latent vector features;
   training, by the variational autoencoder, to generate appropriate distributions around the latent vector features;
   receiving, by a synthetic workload creation platform, information about the distributions around the latent vector features;
   sampling, by the synthetic workload creation platform, different values from the distributions to create synthetic workload vectors; and
   training a workload classification platform, using the synthetic workload vectors, to generate workload classification labels for workloads running on the database system, wherein the workload classification labels are used to adjust at least one tunable parameter of the database system.

10. The method of claim 9, wherein the database system is associated with at least one of: (i) an on-premises database system, (ii) a cloud-based database system, (iii) an Advanced Business Language Application Programming ("ABAP") database system, and (iv) an in-memory, column-oriented, relational database management system.

11. The method of claim 9, wherein the workloads are associated with at least one of: (i) Kubernetes, (ii) containers, and (iii) Virtual Machines ("VMs").

12. The method of claim 9, wherein the utilization metrics vectors are created based on at least one of: (i) Central Processing Unit ("CPU") utilization, (ii) read Input Output ("IO") utilization, (iii) write IO utilization, (iv) memory utilization, and (v) disk utilization.

13. The method of claim 9, wherein the distributions around the latent vector features are Gaussian.

14. The method of claim 9, wherein the tunable parameter is associated with at least one of: (i) memory knobs, (ii)

background writer knobs, (iii) asynchronous and planner estimate knobs, (iv) locking knobs, and (v) any other relevant knob.

15. The method of claim 9, wherein the workload classification labels generated by the workload classification platform are also used to make placement decisions for the workloads running on the database system.

16. The method of claim 9, wherein the workload classification labels generated by the workload classification platform are also used to determine appropriate resource sizes for database systems.

17. A non-transitory, computer readable medium having executable instructions stored therein, the medium comprising:

instructions to receive, by a variational autoencoder, utilization metrics vectors from a utilization metrics data source that contains utilization metrics vectors associated with workloads of the database system;

instructions to encode, by the variational autoencoder, the utilization metrics vectors into latent vector features;

instructions to train, by the variational autoencoder, to generate appropriate distributions around the latent vector features;

instructions to receive, by a synthetic workload creation platform, information about the distributions around the latent vector features;

instructions to sample, by the synthetic workload creation platform, different values from the distributions to create synthetic workload vectors; and instructions to train a workload classification platform, using the synthetic workload vectors, to generate workload classification labels for workloads running on the database system, wherein the workload classification labels are used to adjust at least one tunable parameter of the database system.

18. The medium of claim 17, wherein the workload classification labels generated by the workload classification platform are also used to perform at least one of the following: (i) make placement decisions for the workloads running on the database system, and (ii) determine appropriate resource sizes for database systems.

* * * * *